US012310546B2

(12) United States Patent
Takano

(10) Patent No.: US 12,310,546 B2
(45) Date of Patent: May 27, 2025

(54) WORK MACHINE

(71) Applicant: MAKITA CORPORATION, Anjo (JP)

(72) Inventor: Hideaki Takano, Anjo (JP)

(73) Assignee: MAKITA CORPORATION, Anjo (JP)

( * ) Notice: Subject to any disclaimer, the term of this patent is extended or adjusted under 35 U.S.C. 154(b) by 467 days.

(21) Appl. No.: 17/950,207

(22) Filed: Sep. 22, 2022

(65) Prior Publication Data

US 2023/0114011 A1 Apr. 13, 2023

(30) Foreign Application Priority Data

Oct. 8, 2021 (JP) ................................ 2021-166180

(51) Int. Cl.

*G10K 11/16* (2006.01)
*A47L 9/00* (2006.01)
*G10K 11/178* (2006.01)
*A61F 11/06* (2006.01)

(52) U.S. Cl.

CPC ...... *A47L 9/0081* (2013.01); *G10K 11/17861* (2018.01); *G10K 11/17881* (2018.01); *G10K 11/17883* (2018.01); *G10K 2210/121* (2013.01)

(58) Field of Classification Search

CPC ............ A47L 9/0081; G10K 11/17861; G10K 11/17881; G10K 11/17883; G10K 2210/121
USPC ............................................... 381/71.1, 71.5
See application file for complete search history.

(56) References Cited

U.S. PATENT DOCUMENTS 5,502,869 A 4/1996 Smith et al.
2019/0275657 A1 9/2019 Lanquist

FOREIGN PATENT DOCUMENTS

JP H04187131 A * 11/1990 .......... A47L 9/0081
JP H09-512737 A 12/1997
JP H11-287510 A 10/1999

OTHER PUBLICATIONS

Nov. 19, 2024 Office Action issued in Japanese Patent Application No. 2021-166180.

* cited by examiner

*Primary Examiner* — Ammar T Hamid
(74) *Attorney, Agent, or Firm* — Oliff PLC

(57) ABSTRACT

The work machine includes a path leading into a housing from an opening. The path is provided to control an airflow generated by motion of a machine. The work machine includes a microphone. The microphone is configured to collect sound in the housing, including operating noise generated in the housing by the motion of the machine. The work machine further includes a structure that defines a receiving space for the microphone along the path through which the operating noise propagates outside the housing. The structure includes an open structure that connects the receiving space with the path and faces downstream in the path. The structure surrounds the receiving space upstream of the open structure in the path.

19 Claims, 12 Drawing Sheets

WORK MACHINE

CROSS-REFERENCE TO RELATED APPLICATIONS

This application claims the benefit of Japanese Patent Application No. 2021-166180 filed on Oct. 8, 2021 with the Japan Patent Office, the entire disclosure of which is incorporated herein by reference.

BACKGROUND

The present disclosure relates to a work machine.

U.S. Patent Application Publication No. 2019/0275657 discloses an electric power tool to which active noise control (ANC) is applied. ANC is a technique for canceling noise by using sounds collected by a microphone to generate a sound having an inverted phase of the noise at a location where the noise is desired to be canceled.

SUMMARY

A sound signal output as an electrical signal from the microphone by sound collection may sometimes contain a pseudo-sound component (specifically, a fluid pressure fluctuation component) as a wind noise component. The pseudo-sound component contained in the sound signal may adversely affect the results of certain processes based on the sound signal.

For example, the pseudo-sound component contained in the sound signal is not the type of noise component audible to a user who works on a work machine, and may adversely affect noise reduction by ANC. When detecting a failure in the work machine based on the sound signal, the pseudo-sound component can also be a cause of lowering accuracy of failure detection.

One aspect of the present disclosure is to inhibit a microphone, which collects operating noise in a housing of a work machine, from collecting wind noise (in other words, pseudo-sound).

According to one aspect of the present disclosure, a work machine is provided. The work machine includes a machine. The work machine includes a housing. The housing at least partly houses the machine. The housing has an opening.

The work machine has a path leading into the housing from the opening.

The path is provided to control an airflow generated by motion of the machine. The work machine includes a microphone. The microphone is configured to collect sound in the housing, including operating noise generated in the housing by the motion of the machine. The microphone is configured to output a sound signal that is an electrical signal corresponding to the sound.

The work machine further includes a structure that defines a receiving space for the microphone along the path through which the operating noise propagates outside the housing.

According to one aspect of the present disclosure, the microphone is arranged in the receiving space in the housing. The structure includes an open structure that connects the receiving space with the path and faces downstream in the path. The structure surrounds the receiving space in upstream of the open structure in the path.

According to the work machine configured as above, it is possible to inhibit the microphone from collecting wind noise (in other words, pseudo-sound) when the microphone collects the operating noise in the work machine that may propagate outside the housing from the opening through the path for airflow control.

BRIEF DESCRIPTION OF THE DRAWINGS

Example embodiments of the present disclosure will be described hereinafter with reference to the accompanying drawings, in which.

DETAILED DESCRIPTION OF EXEMPLARY EMBODIMENTS

1. Overview of Embodiments

Figure 1:
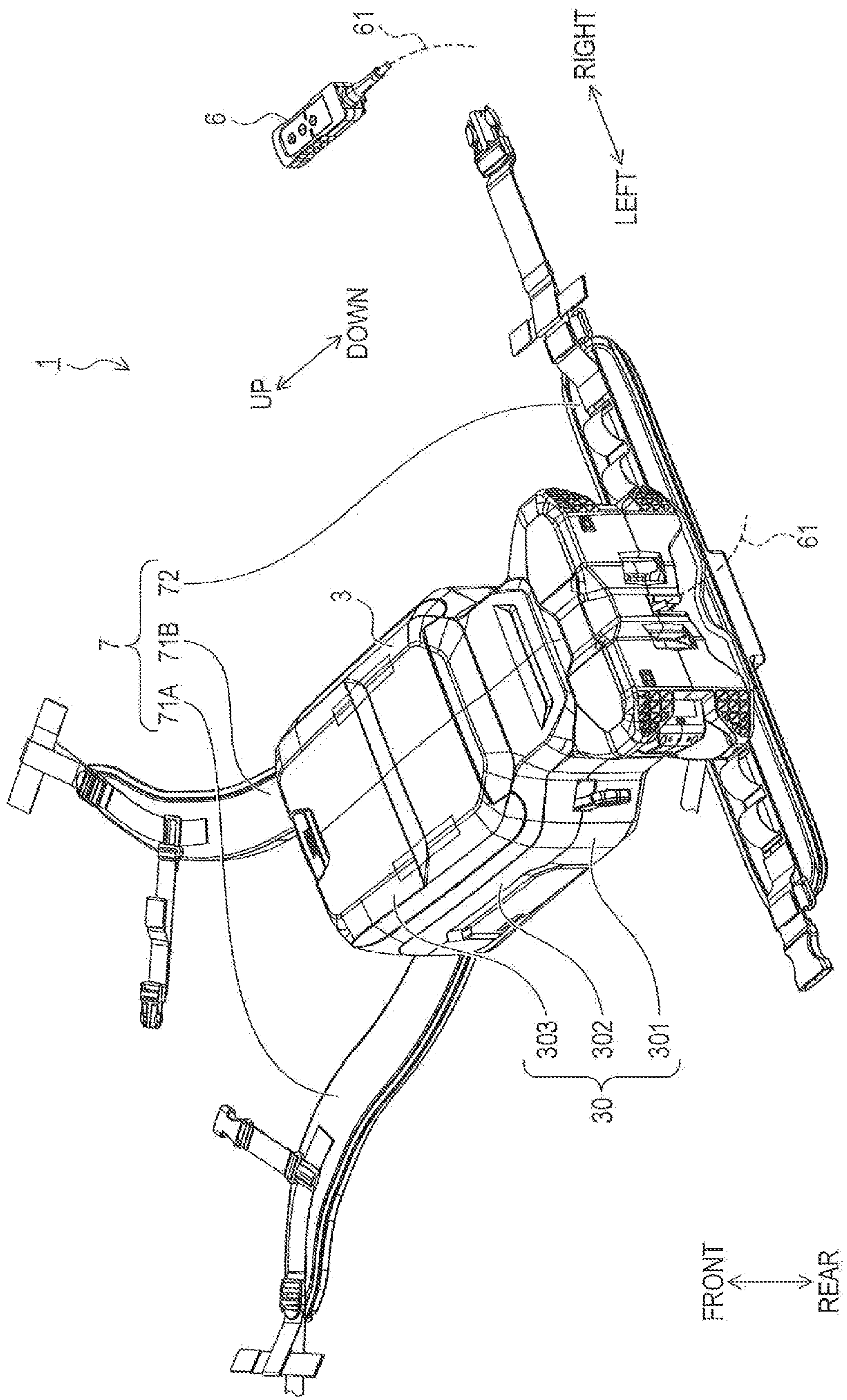
FIG. 1 is a perspective view showing the appearance of a dust collector according to one example embodiment.

A work machine in one embodiment may include a machine. The machine may be configured to work for a specific operation. Additionally or alternatively, the work machine may include a housing. The housing may at least partly house the machine. The housing may have an opening.

Additionally or alternatively, the work machine may include a path. The path may be arranged to lead into the housing from the opening. The path may be provided to control an airflow generated by motion of the machine.

Additionally or alternatively, the work machine may include a microphone. The microphone may be arranged to collect sound in the housing. The microphone may collect sound in the housing including operating noise generated in the housing by the motion of the machine. The microphone may be configured to output a sound signal that is an electrical signal corresponding to the sound.

Additionally or alternatively, the work machine may include a processor. The processor may be configured to execute a process based on the sound signal from the microphone. For example, the processor may be configured to execute a process related to the operating noise based on the sound signal from the microphone.

Additionally or alternatively, the work machine may include a structure that defines a receiving space for the microphone. The structure may define the receiving space for the microphone along the path. The operating noise may propagate outside the housing through the path.

In one embodiment, the microphone may be arranged in the receiving space in the housing. In one embodiment, the structure may include an open structure that faces downstream in the path. The open structure may connect the receiving space with the path. The structure may surround the receiving space upstream of the open structure in the path. The structure may be arranged to inhibit the airflow from traveling toward the receiving space from upstream of the open structure in the path.

In one embodiment, the structure may include a partition wall. The partition wall may define the receiving space. The partition wall may extend from a side wall of the path. The partition wall may define the receiving space between the side wall of the path and the partition wall. The partition wall may surround the receiving space between the side wall of the path and the partition wall.

In one embodiment, the partition wall may extend from the side wall of the path toward downstream in the path and away from the side wall. The partition wall may use the side wall to surround the receiving space between the side wall and the partition wall in the downstream of a connecting point between the side wall and the partition wall in the path.

In one embodiment, the partition wall may include a first wall element connected to the side wall of the path and extending away from the side wall. The partition wall may include a second wall element extending from the first wall element toward the downstream in the path. The partition wall may be arranged to inhibit the airflow from traveling toward the receiving space from upstream of the open structure between the downstream end of the partition wall and the side wall of the path.

In one embodiment, the partition wall may extend over the entire height of the path from bottom to ceiling of the path to cover the receiving space upstream of the open structure in the path. With the partition wall extending over the entire height of the path, it is possible to effectively inhibit the airflow from traveling toward the receiving space from upstream of the open structure in the path. Accordingly, collection of unwanted wind noise by the microphone can be inhibited during collection of the operating noise in the work machine.

In one embodiment, the structure may be provided to cover the entire space of the receiving space located upstream of the open structure in the path. With the structure as such, collection of unwanted wind noise by the microphone can be inhibited.

In one embodiment, the work machine may include a windshield that surrounds the microphone. The microphone may be arranged in the receiving space in a state surrounded by the windshield. In one embodiment, the work machine may include a porous material for rectification that covers a side of the partition wall opposite to a side facing the receiving space.

In one embodiment, the work machine may include a speaker. The process related to the operating noise may include a process to cause the speaker to output a control sound for inhibiting the operating noise from propagating outside the housing. By causing the speaker to output the control signal based on the sound signal having little wind noise component, it is possible to reduce control error by the wind noise component, and effectively generate the control sound for canceling the operating noise.

In one embodiment, the path may be an exhaust path for guiding the airflow generated by the motion of the machine out of the housing. The opening may be an exhaust port. The receiving space for the microphone may be defined along the exhaust path.

According to this embodiment, the operating noise that is about to propagate outside the housing through the exhaust path can be properly collected by the microphone while the influence of the wind noise is reduced. Accordingly, in case of performing control for canceling the operating noise by the control sound, it is possible to reduce control error by the wind noise component, and effectively generate the control sound for canceling the operating noise.

One or more of the components of the aforementioned work machine may be removed as desired. The work machine may include an additional component as desired. One or more of the components of the work machine may be replaced with another component or components as desired.

2. Specific Exemplary Embodiment

[2.1. Configuration of Dust Collector]

A configuration of a dust collector 1 will be described hereinafter, as an example of a work machine. For convenience of description, the direction (front, rear, up, down, left and right) relative to the dust collector 1 is defined as shown in FIGS. 1 to 8 in the present embodiment.

As shown in FIG. 1, the dust collector 1 of the present embodiment includes a main body 3, an operation device 6, and attachments 7. The attachments 7 include shoulder belts 71A, 71B, and a waist belt 72. The shoulder belts 71A, 71B and the waist belt 72 are attached to the rear surface of the main body 3.

The shoulder belt 71A extends from near the upper left end of the main body 3. The shoulder belt 71B extends from near the upper right end of the main body 3. The waist belt 72 extends from near the bottom end of the main body 3. The attachments 7 are used for an operator of the dust collector 1 to carry the main body 3 on its back.

The operation device 6 includes a switch to start or stop the dust collector 1. The operation device 6 is manipulated by the operator. The operation device 6 is connected, via a cable 61, to the main body 3 near the center of the bottom end of the main body 3.

Figure 2:
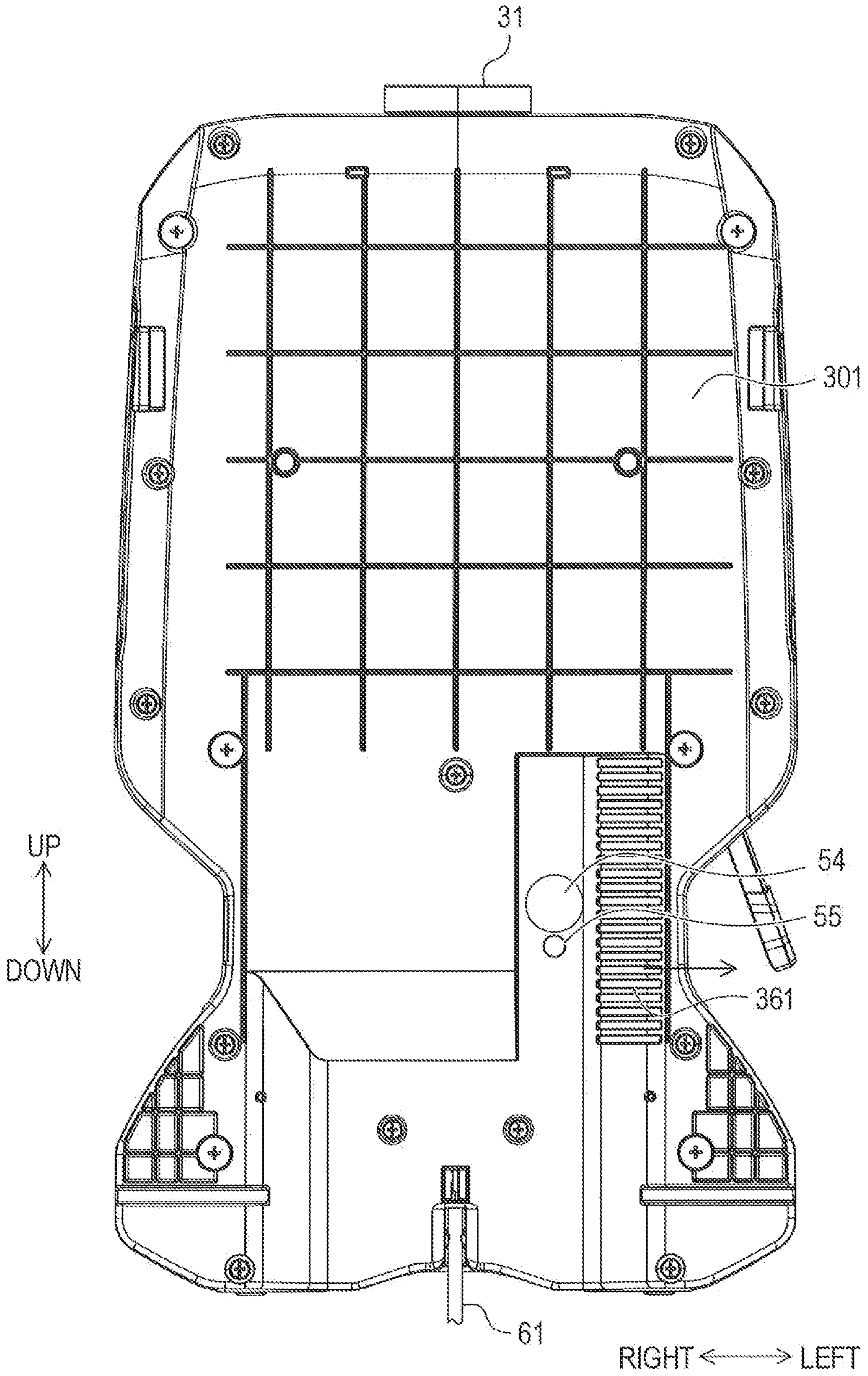
FIG. 2 is a bottom view of a dust collector main body.
Figure 3:
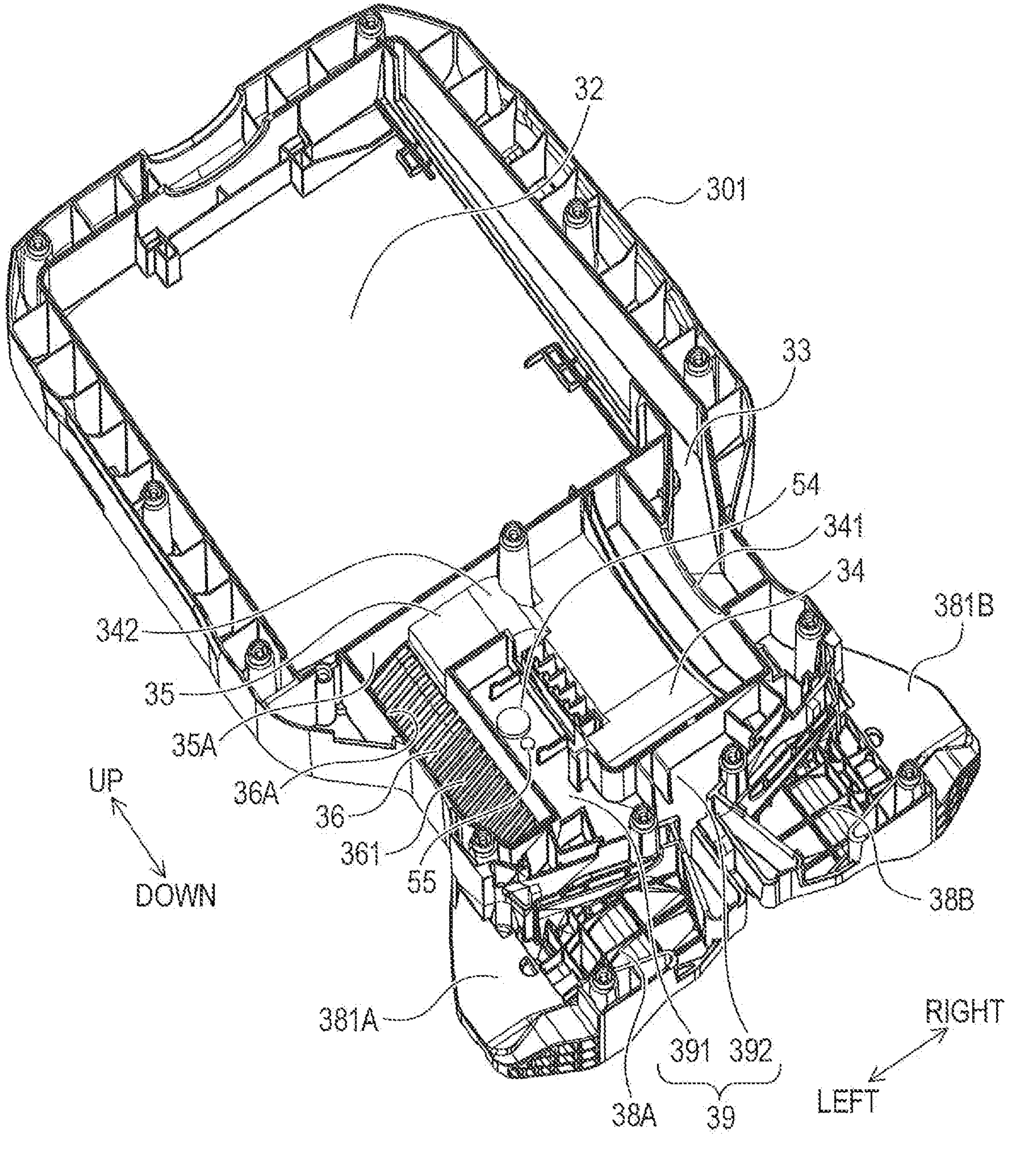
FIG. 3 is a perspective view of a rear housing with its internal components removed, as seen from a joining surface between a front housing and the rear housing.
Figure 4:
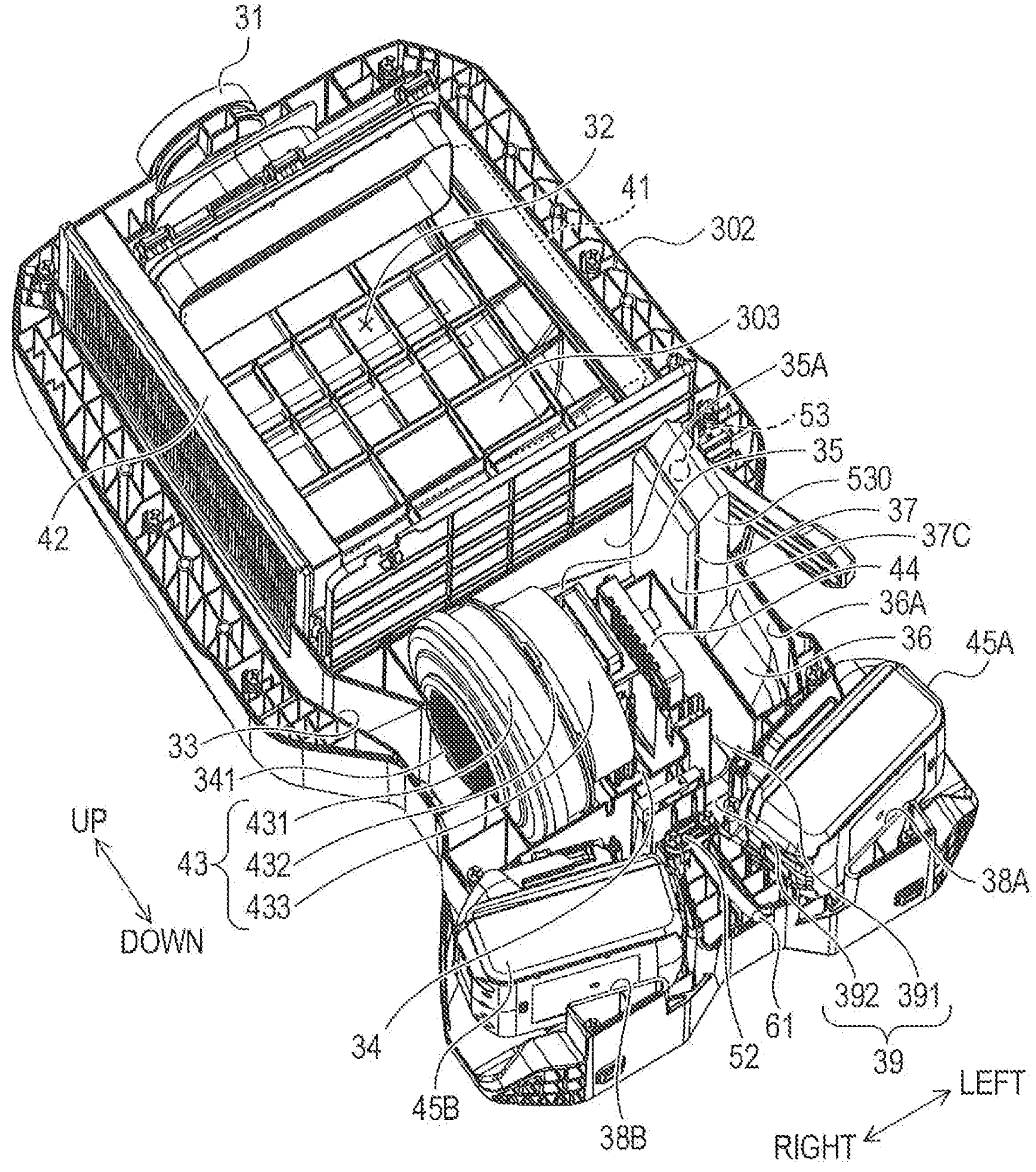
FIG. 4 is a perspective view showing an interior of the dust collector with the rear housing removed from the collector main body.
Figure 5:
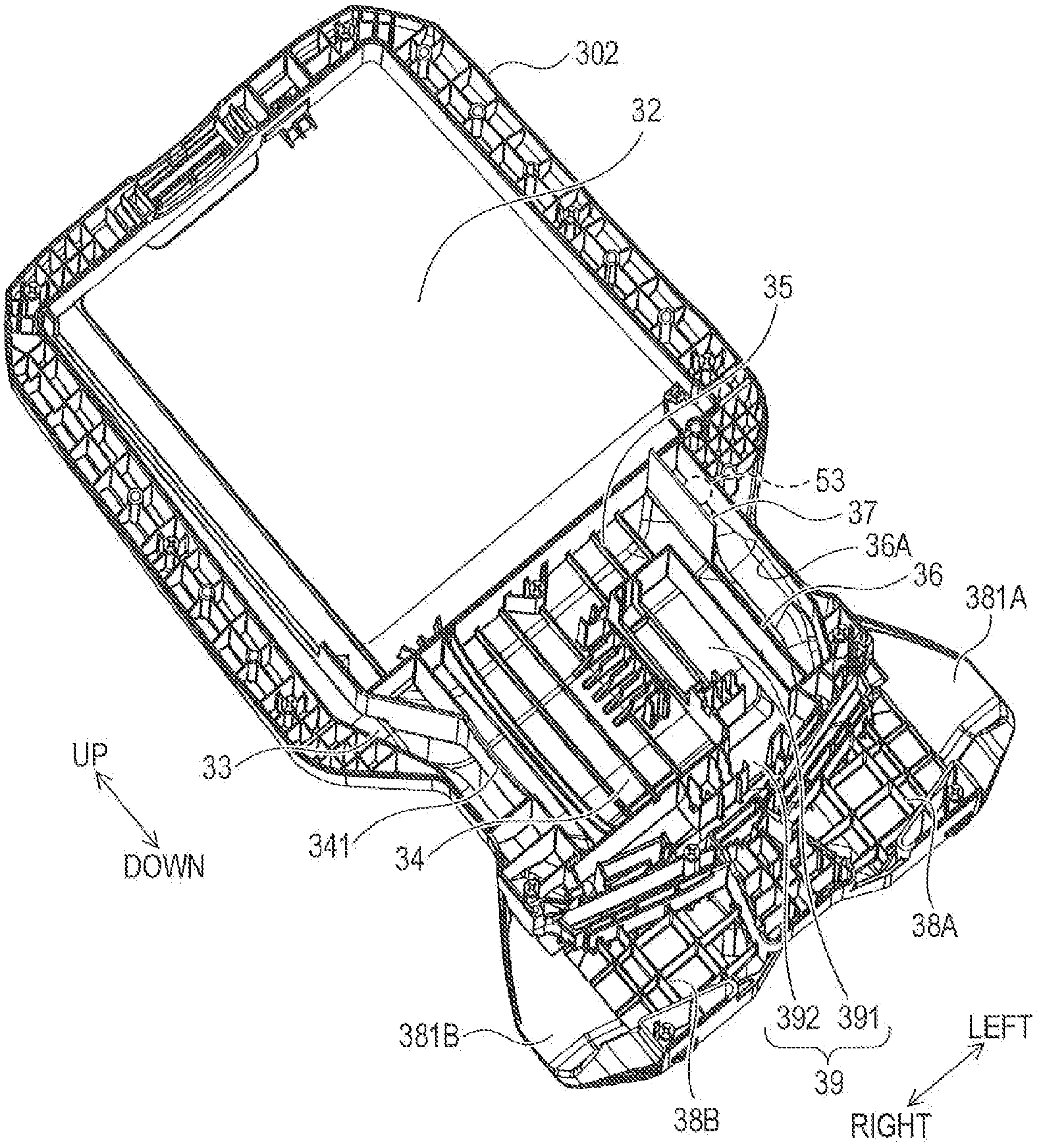
FIG. 5 is a perspective view of the front housing with its internal components removed, as seen from the joining surface between the front housing and the rear housing.

The main body 3 includes a housing 30 for housing major electrical and/or mechanical components of the dust collector 1. The housing 30 includes a rear housing 301, a front housing 302, and a plate 303. FIGS. 2 and 3 show a configuration of the rear housing 301. FIGS. 4 and 5 show a configuration of the front housing 302.

The rear housing 301 is a bottomed box-shaped member having an inner surface facing the front. The front housing 302 is a frame-shaped member with an opening. The plate 303 is a plate-shaped member that closes the opening of the front housing 302 from the front. The housing 30 is, for example, mold by injecting a resin material.

As shown in FIGS. 3, 4, and 5, the housing 30 includes a suction port 31, a dust collecting chamber 32, a first flow path 33, a motor chamber 34, a second flow path 35, a third flow path 36, a partition wall 37, a first battery compartment 38A, a second battery compartment 38B, and a component placement portion 39.

The suction port 31 is provided in the central portion of the top end of the housing 30. The suction port 31 is connected to a first end of a flexible hose (not shown). A second end of the hose is connected to a nozzle having a suction port (not shown).

As shown in FIG. 4, the dust collecting chamber 32 is a rectangular internal chamber provided on the upper side of the housing 30. The dust collecting chamber 32 stores a dust bag 41 that is connected to the suction port 31. The dust bag 41 is made of, for example, paper. The dust bag 41 traps and collects dust sucked from the suction port 31.

The first flow path 33 is provided along the right side of the dust collecting chamber 32. The bottom end of the first flow path 33 is connected to the motor chamber 34. A filter 42 is arranged at the boundary between the first flow path 33 and the dust collecting chamber 32. Examples of the filter 42 may include a high efficiency particulate air filter (HEPA).

Figure 6:
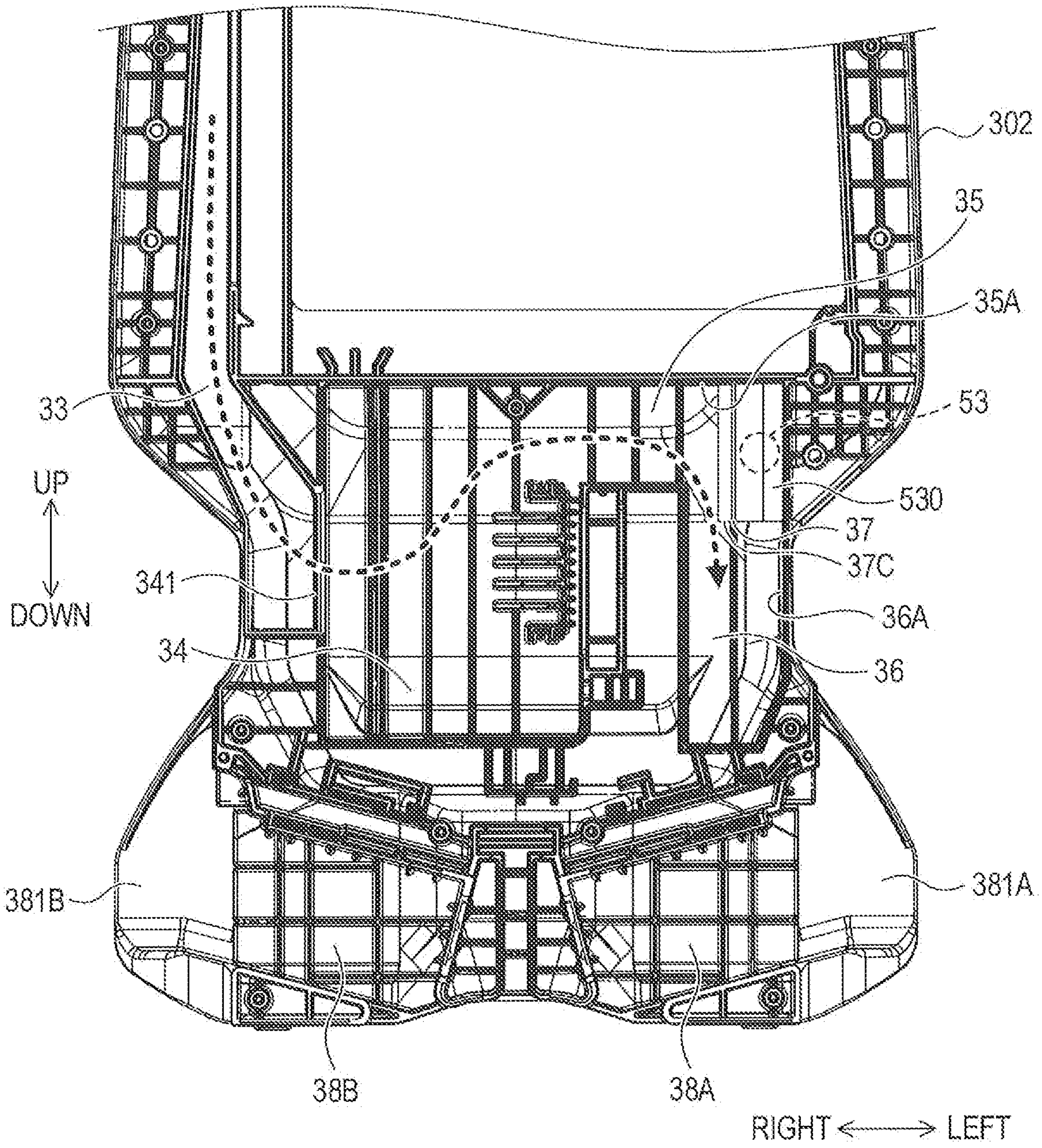
FIG. 6 is a partly enlarged plan view of the front housing including components related to a partition wall, as seen from the joining surface between the front housing and the rear housing.
Figure 7:
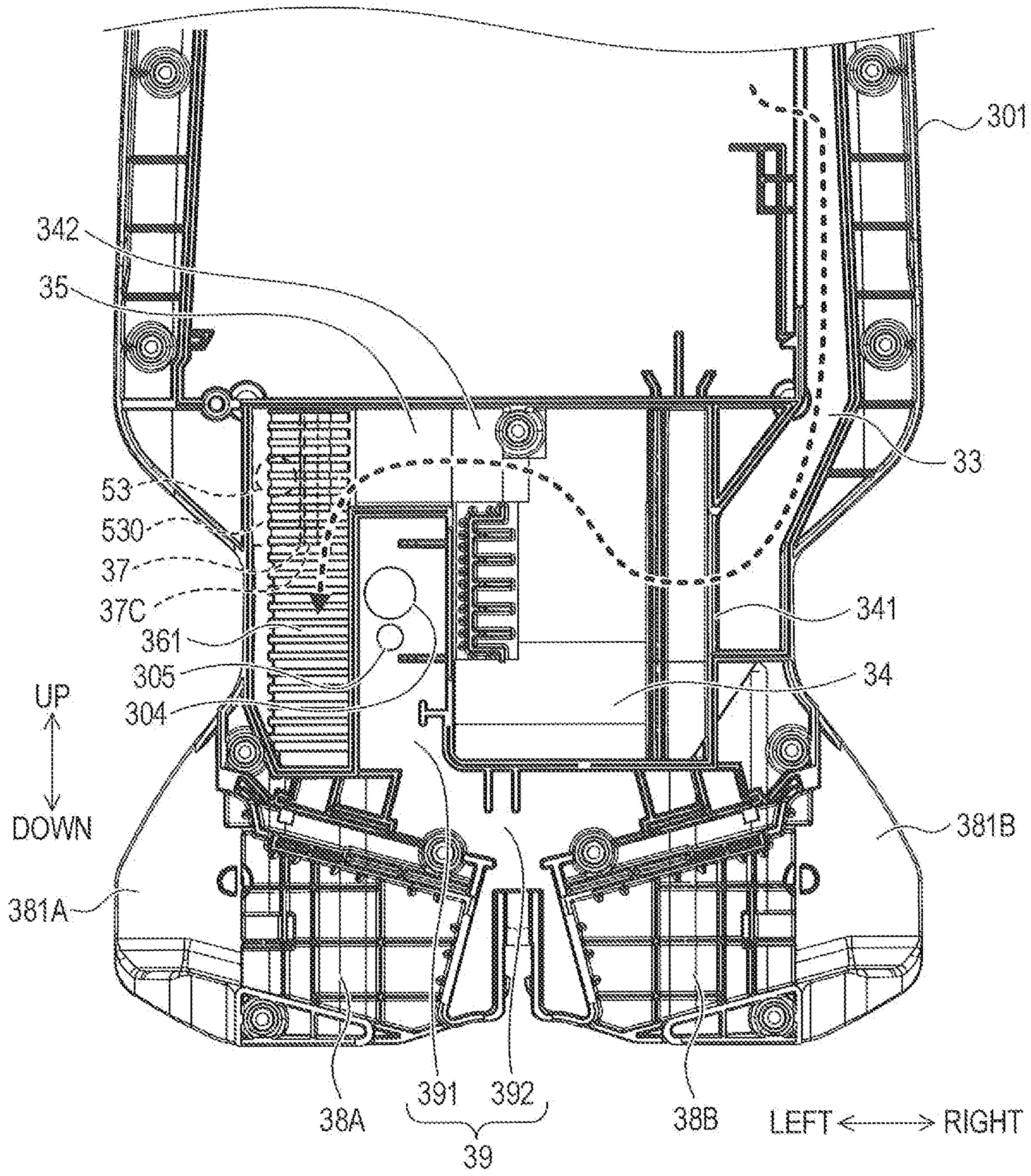
FIG. 7 is a partly enlarged plan view of the rear housing, as seen from the joining surface between the front housing and the rear housing.

The motor chamber 34 is an internal chamber provided below the dust collecting chamber 32. As shown in FIGS. 6 and 7, the motor chamber 34 includes an inlet port 341 in the central portion of the right end of the motor chamber 34. The inlet port 341 is connected to the first flow path 33. The motor chamber 34 further includes an outlet port 342 in the upper portion of the left end of the motor chamber 34. The outlet port 342 is connected to the second flow path 35. The motor chamber 34 houses a drive machine 43. A thick dotted arrow shown in FIGS. 6 and 7 conceptually represents an airflow.

The drive machine 43 includes a fan 431, a motor 432, and a damper 433. The fan 431 is connected to a rotation shaft of the motor 432. The fan 431 receives power from the motor 432 and is rotationally driven. As a result, an airflow that travels from the inlet port 341 toward the outlet port 342 of the motor chamber 34 is generated.

Figure 8:
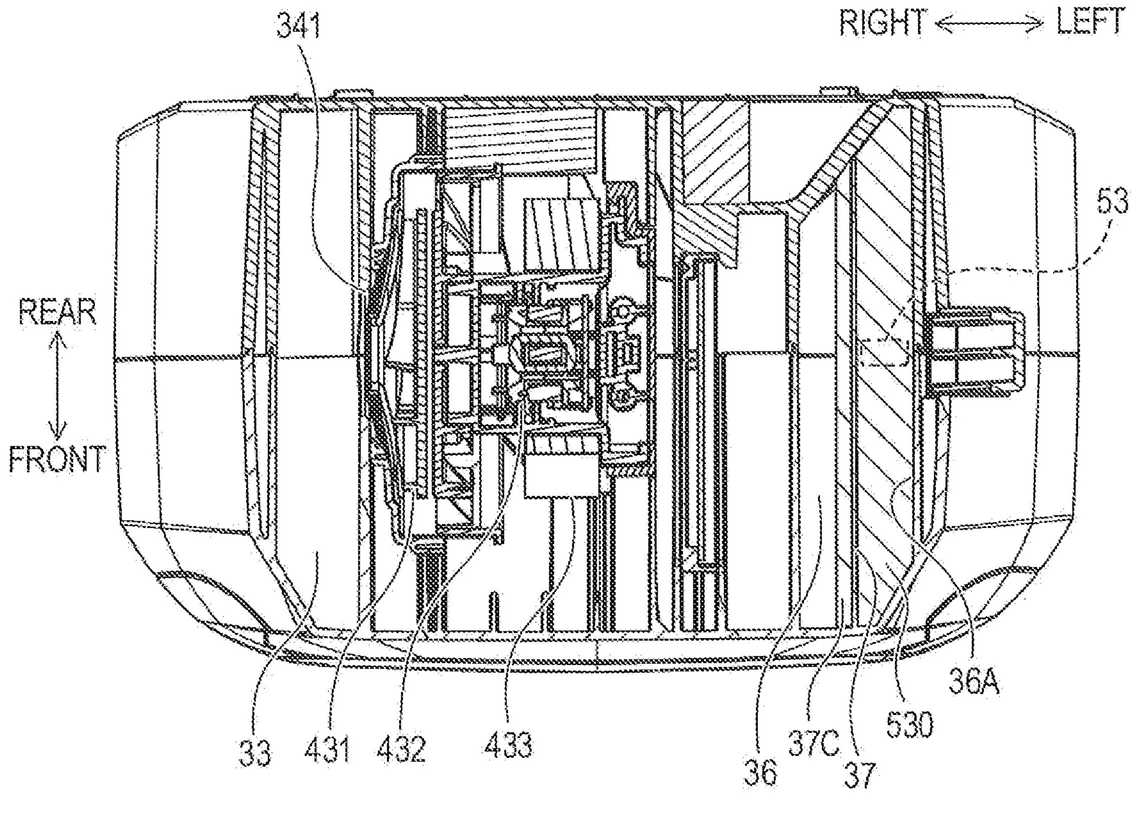
FIG. 8 is a sectional view perpendicular to a vertical direction of the dust collector main body.

The damper 433 is an annular member that covers the motor 432. The damper 433 absorbs noise generated by the motor 432. In FIG. 4, the motor 432 is arranged in the center of the damper 433 although not shown because the motor 432 is covered with the damper 433. FIG. 8 shows the arrangement of the motor 432.

The second flow path 35 is an exhaust path provided on the upper side of the motor chamber 34 and extending leftward from the motor chamber 34. The second flow path 35 connects the outlet port 342 of the motor chamber 34 with the third flow path 36.

The third flow path 36 is an exhaust path provided to the left of the motor chamber 34 and extending downward. The third flow path 36 includes an exhaust port 361 in its downstream portion. As shown in FIGS. 2 and 7, the exhaust port 361 has the form of a group of slits that are formed on the rear surface of the housing 30. An arrow from the exhaust port 361 shown in FIG. 2 conceptually represents an exhaust from the exhaust port 361 to the outside of the housing 30.

The second flow path 35 and the third flow path 36 form an L-shaped exhaust path, and controls the airflow from the motor chamber 34 to the exhaust port 361. Specifically, the second flow path 35 and the third flow path 36 guide the airflow from the motor chamber 34 out of the housing 30 through the exhaust port 361.

The partition wall 37 extends downward, which is a direction orthogonal to an upper side wall 35A of the second flow path 35, from the side wall 35A. The side wall 35A extends leftward. The partition wall 37 extends downward, which is a direction away from the side wall 35A of the second flow path 35, in other words, toward downstream in the exhaust path, with a specified interval from a left side wall 36A of the third flow path 36. The side wall 36A extends downward.

The partition wall 37, as shown in FIG. 5, stands from a surface of the front housing 302 facing the rear housing 301 toward the rear housing 301. This allows the partition wall 37 to be provided along the third flow path 36 to extend over the entire height of the third flow path 36 from ceiling to bottom, as shown in FIG. 8.

With this arrangement, the partition wall 37 defines a receiving space for the microphone 53 along the exhaust path, in particular the third flow path 36. The partition wall 37 functions as a structure that defines the receiving space for the microphone 53. FIG. 5 shows the microphone 53 arranged in the receiving space by a dotted line.

Specifically, the partition wall 37 defines the receiving space for the microphone 53 between the partition wall 37 and the side walls 35A, 36A. The partition wall 37 surrounds the receiving space for the microphone 53 together with the side wall 35A of the second flow path 35 and the side wall 36A of the third flow path 36 in the downstream of a connecting point between the partition wall 37 and the side wall 35A of the second flow path 35 in the exhaust path.

An open structure that connects the receiving space for the microphone 53 with the third flow path 36 is formed between the lower end of the partition wall 37, in other words, the downstream end of the partition wall 37, and the side wall 36A of the third flow path 36. The receiving space for the microphone 53 is surrounded without leakage from the front, rear, left, right and above by the partition wall 37, the side wall 35A of the second flow path 35, the side wall 36A of the third flow path 36, the bottom of the rear housing 301, and the inner surface of the front housing 302, in the entire upstream of the open structure in the exhaust path.

The microphone 53 is received in the receiving space between the partition wall 37 and the side walls 35A, 36A in a state surrounded with a porous material 530 from all directions. FIG. 4 shows the microphone 53 hidden by the porous material 530 by a dotted line. The porous material 530 functions as a windshield.

The porous material 530 has a shape corresponding to the receiving space for the microphone 53, and substantially fills the receiving space for the microphone 53 except for a space where the microphone 53 is exactly fitted. A porous material 37C for rectification is attached to the entire right surface of the partition wall 37 opposite to a left surface facing the side wall 36A. FIG. 7 shows the arrangement of the partition wall 37, the microphone 53, the porous material 530, and the porous material 37C in the rear housing 301 by dotted lines.

Examples of the porous material include fiber-based sound absorbing base materials and foam-based sound absorbing base materials. Examples of the fiber-based sound absorbing base material include glass wool, rock wool, polyester nonwoven material, etc. Examples of the foam-based sound absorbing base material include polyurethane foam, etc. As the porous material 530, a material suitable for a windshield may be selected from the aforementioned specific materials. As the porous material 37C, a material suitable for rectification may be selected from the aforementioned specific materials. In selection of the material, usage environment, resistance, costs, etc. may be taken into consideration. As the porous material 530 and the porous material 37C, a foam-based sound absorbing base material, for example, polyurethane foam may be used.

The microphone 53 is used as a reference microphone in ANC. Hereinafter, the microphone 53 is referred to as a reference microphone 53. The reference microphone 53 is arranged in the housing 30 in order to collect sound in the housing 30, including operating noise of the dust collector 1 generated in the housing 30 by the motion of a machine in the housing 30. The reference microphone 53 outputs a sound signal that is an electrical signal corresponding to the collected sound.

The operating noise collected by the reference microphone 53 is the noise (hereinafter, referred to as target noise) that should be controlled to be damped outside the housing 30 by ANC. The target noise includes noise generated from the motor 432 and the fan 431 of the drive machine 43 and noise generated by an airflow generated by the motion of the drive machine 43.

The reference microphone 53 is installed in the aforementioned receiving space along the exhaust path so that the target noise that propagates outside the housing 30 through the exhaust path and the exhaust port 361 can be efficiently and properly collected.

In the main body 3 configured as above, when the airflow is generated by the motion of the drive machine 43, external air is sucked into the internal space of the housing 30 through the suction port 31. The sucked external air first enters the dust collecting chamber 32, and passes through the dust bag 41 attached to the suction port 31. This passing through allows the dust contained in the external air to be trapped.

The air that has passed through the dust bag 41 reaches the first flow path 33 via the filter 42. The air that has reached the first flow path 33 passes through the motor chamber 34 and the second flow path 35 to the third flow path 36, and is discharged to outside the housing 30 through the exhaust port 361.

Part of the operating noise that is about to propagate outside the housing 30 through the exhaust port 361 is collected by the reference microphone 53 as the target noise. As mentioned above, the open structure for guiding the operating noise to the reference microphone 53 is provided between the partition wall 37 and the side wall 36A. Thus, the operating noise is properly collected by the reference microphone 53 through the open structure and the porous material 530.

The receiving space for the reference microphone 53 is surrounded without leakage from all directions upstream of the open structure except for a direction facing the open structure, and is isolated from a main line of the exhaust path. Accordingly, almost no airflow is generated in the receiving space for the reference microphone 53, as compared to the exhaust path. Wind noise as a pseudo-sound collected by the reference microphone 53 is largely reduced.

The first battery compartment 38A of the housing 30 defines a space that houses the first battery pack 45A. The first battery compartment 38A is provided near the bottom end of the housing 30. The first battery compartment 38A includes a first battery mounting port 381A that is open near the lower left end of the housing 30.

The second battery compartment 38B defines a space that houses the second battery pack 45B. The second battery compartment 38B is provided near the bottom end of the housing 30. The second battery compartment 38B includes a second battery mounting port 381B that is open near the lower right end of the housing 30. The first and second battery packs 45A, 45B are respectively inserted from the first and second battery mounting ports 381A, 381B to the first and second battery compartments 38A, 38B.

The component placement portion 39 is an internal space located between the motor chamber 34, the second flow path 35, the third flow path 36, and the first and second battery compartments 38A, 38B. Various electrical components are arranged in this internal space.

The component placement portion 39 includes a vertical portion 391 and a horizontal portion 392 that communicates with the vertical portion 391. The vertical portion 391 corresponds to a portion surrounded on three sides by walls of the motor chamber 34, the second flow path 35, and the third flow path 36. The horizontal portion 392 corresponds to a portion that is placed between the motor chamber 34 and the first and second battery compartments 38A, 38B.

A connector 52 is arranged in the horizontal portion 392. The connector 52 is arranged between the first battery compartment 38A and the second battery compartment 38B. The connector 52 is provided to connect a cable 61 of the operation device 6 with an internal circuit.

A drive controller 44, a control speaker 54, and an error microphone 55 are arranged in the vertical portion 391. The control speaker 54 and the error microphone 55 are used in ANC. The control speaker 54 and the error microphone 55 are mounted respectively using the mounting holes 304, 305. The mounting holes 304, 305 are formed on the bottom surface of the rear housing 301 so that the control speaker 54 and the error microphone 55 are directional toward the outside of the housing 30.

As shown in FIG. 4, the drive controller 44 is attached to a wall that defines a boundary between the vertical portion 391 and the motor chamber 34. The drive controller 44 is a circuit board that performs power supply control, motor control, noise control, and so on. Details of the drive controller 44 will be described later.

The error microphone 55 is arranged at a location corresponding to a noise canceling point and not directly hit by the airflow generated by the drive machine 43. The location corresponding to the noise canceling point is where the error microphone 55 can be assumed to be at the noise canceling point. The location corresponding to the noise canceling point is specifically in the vicinity of the exhaust port 361.

The control speaker 54 outputs the control sound to cancel the target noise. The reference microphone 53, the control speaker 54, and the error microphone 55 are arranged so that time for the control sound emitted from the control speaker 54 to reach the noise canceling point is shorter than time for the target noise to directly reach the noise canceling point. During the time difference, a process to generate the control sound is executed.

The control speaker 54 emits the control sound toward the outside of the housing 30. The error microphone 55 collects a combined sound of the target noise discharged from the exhaust port 361 and the control sound. The control speaker 54 is capable of emitting a sufficiently louder sound than the target noise. The error microphone 55 is capable of receiving the combined sound of the target noise and the control sound without distortion.

[2.2. Drive Controller]

Figure 9:
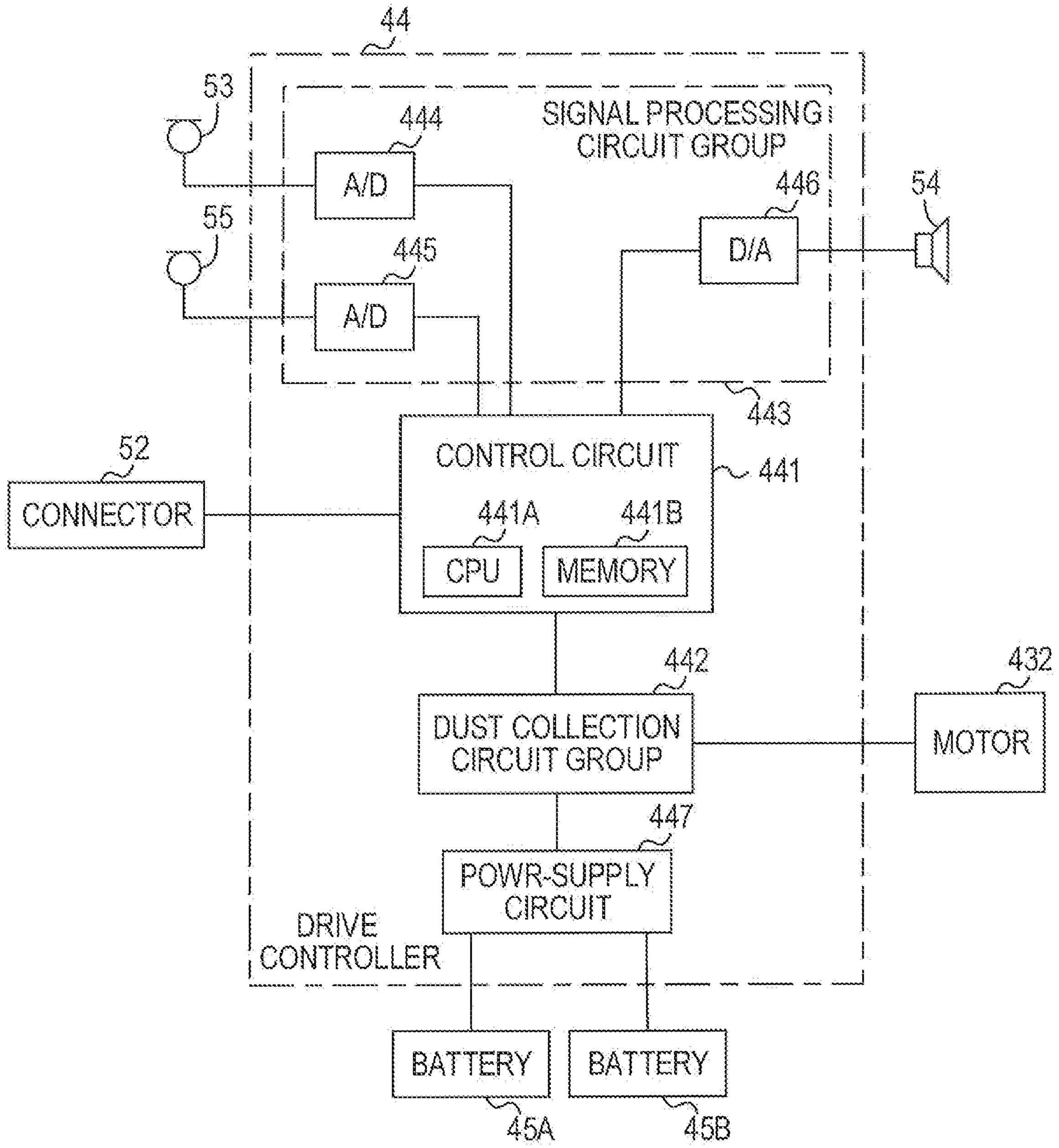
FIG. 9 is a block diagram showing an electrical configuration of the dust collector.

As shown in FIG. 9, the drive controller 44 includes a control circuit 441, a dust collection circuit group 442, a signal processing circuit group 443, and a power-supply circuit 447.

The power-supply circuit 447 delivers electric power supplied from the first and second battery packs 45A, 45B to each part of the dust collector 1 at an appropriate voltage. The control circuit 441 is configured as a microcomputer. The control circuit 441 includes a CPU 441A and a memory 441B.

As another example, the control circuit 441 may include, in place of or in addition to the microcomputer, a combination of electronic components such as, for example, discrete devices. The control circuit 441 may include a digital signal processor (DSP) and/or an application specific IC (ASIC). The control circuit 441 may include an application specific standard product (ASSP). The control circuit 441 may include a programmable logic device.

The dust collection circuit group 442 includes circuits necessary to perform the function as the dust collector 1. Specifically, the dust collection circuit group 442 includes a motor drive circuit and a battery switching circuit. The motor drive circuit drives the motor 432. The battery switching circuit appropriately switches a supply source of electric power between the first and second battery packs 45A, 45B depending on the remaining energies of the first and second battery packs 45A, 45B.

The signal processing circuit group 443 includes various types of circuits necessary to perform the function as a noise controller. The signal processing circuit group 443 includes first and second analog/digital (A/D) converters 444, 445 and a digital/analog (D/A) converter 446.

The first A/D converter 444 converts a sound signal from the reference microphone 53 to a digital signal and supplies the digital signal to the control circuit 441. The second A/D converter 445 converts a sound signal from the error microphone 55 to a digital signal and supplies the digital signal to the control circuit 441. The D/A converter 446 converts control data from the control circuit 441 to analog data in order to generate a control signal to be supplied to the control speaker 54.

The control circuit 441 controls the dust collection circuit group 442. As a result, a process for achieving the function as the dust collector 1 is executed. The control circuit 441 also executes a noise reduction process for reducing the target noise as a process related to the operating noise.

The control circuit 441 executes a noise control process. As a result, feed-forward active noise control (ANC) is achieved. By ANC, the control sound for inhibiting the operating noise from propagating outside the housing 30, in other words, the control sound for canceling the target noise, is output from the control speaker 54.

[2.3. ANC Model]

Figure 10:
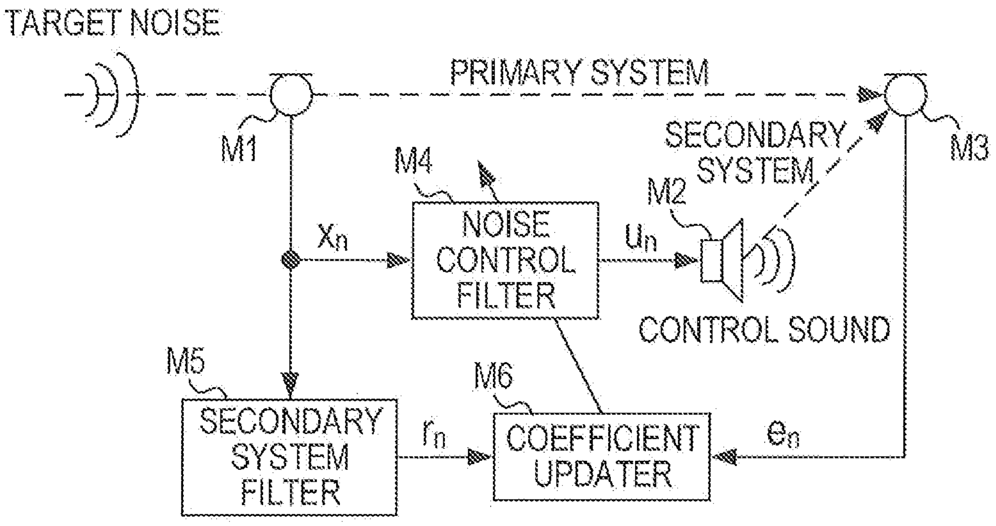
FIG. 10 is a block diagram showing a feed-forward ANC model.

Referring to FIG. 10, the feed-forward ANC model applied to the dust collector 1 will be described. The feed-forward ANC model includes a reference sensor M1, a control sound source M2, an error sensor M3, a noise control filter M4, a secondary system filter M5, and a coefficient updater M6.

The reference sensor M1 corresponds to the reference microphone 53 and the first A/D converter 444. The control sound source M2 corresponds to the D/A converter 446 and the control speaker 54. The error sensor M3 corresponds to the error microphone 55 and the second A/D converter 445.

All of the noise control filter M4, the secondary system filter M5, and the coefficient updater M6 may be implemented by processes of the control circuit 441, that is, software. Alternatively, some or all of the noise control filter M4, the secondary system filter M5, and the coefficient updater M6 may be implemented by hardware.

The reference sensor M1 generates a reference signal $x_n$ by collecting the target noise. The reference signal $x_n$ corresponds to a digital signal generated by sampling the sound signal from the reference microphone 53 at a specific sampling cycle. The subscript "n" represents discrete time, and indicates that the corresponding reference signal $x_n$ is the $n^{th}$ sampling data.

The noise control filter M4 is a finite impulse response (FIR) filter including L taps. "L" is a positive integer. The noise control filter M4 generates a control signal $u_n$ from an L-dimensional reference vector x(n) having L reference signals $\{x_n, x_{n-1}, \ldots, x_{n-L+1}\}$ that are most recently detected.

The control sound source M2 produces a control sound in accordance with the control signal $u_n$. The error sensor M3 generates an error signal $e_n$ by collecting the combined sound of the target noise and the control sound. The error signal $e_n$ corresponds to a digital signal generated by sampling the sound signal from the error microphone 55 at a specific sampling cycle.

Hereinafter, a sound propagation path from the reference sensor M1 to the error sensor M3 is referred to as a primary system, and a sound propagation path from the control sound source M2 to the error sensor M3 is referred to as a secondary system. The secondary system filter M5 is a FIR filter including N taps. "N" is a positive integer. The secondary system filter M5 generates a filtered reference signal $r_n$ from an N-dimensional reference vector x(n) having N reference signals $\{x_n, x_{n-1}, \ldots, x_{n-N+1}\}$ that are most recently detected.

The secondary system filter M5 is a filter modeled on the transfer characteristics of the secondary system. A fixed value is used for a coefficient of each tap. The filtered reference signal $r_n$ is a signal obtained by adding the influence of the secondary system, which is added to the control sound when the control sound reaches the error sensor M3, to the reference signal $x_n$.

The coefficient updater M6 updates the coefficients $\{w_1, w_2, \ldots, w_L\}$ of L taps included in the noise control filter M4 based on the filtered reference signal $r_n$ and the error signal $e_n$. The coefficients $\{w_1, w_2, \ldots, w_L\}$ are updated at the position of the error sensor M3 (that is, the noise canceling point) so that the target noise and the control sound cancel each other out and the error signal $e_n$ becomes the smallest.

The coefficients of the noise control filter M4 may be updated with, for example, the Filtered-x LMS algorithm that is one of adaptive algorithms. Due to the coefficient update, the target noise attenuates to be canceled by the control sound outside the housing 30.

[2.4. Effect of Dust Collector]

The dust collector 1 of the present embodiment described in the above achieves the following effects.

(2.4.1) The operating noise generated in the housing 30 of the dust collector 1 and leaking outside the housing 30 through the exhaust port is collected by the reference microphone 53 provided along the exhaust path. The control sound for canceling the operating noise that propagates outside the housing 30 is output from the control speaker 54. Accordingly, it is possible to effectively inhibit the operating noise of the dust collector 1 from spreading to the surroundings as unpleasant noise.

(2.4.2) The partition wall 37 that defines the receiving space for the reference microphone 53 inhibits the airflow from traveling toward the reference microphone 53. Thus, the wind noise component as the pseudo-sound component is effectively reduced in the sound signal of the reference microphone 53 used for generation of the control sound. Accordingly, deterioration of the effect of canceling the operating noise by the control sound due to the wind noise component can be effectively inhibited. The dust collector 1 in which the operating noise audible to the user is low can be configured.

(2.4.3) The open structure is provided at an end of the partition wall 37 so that the operating noise to be collected by the reference microphone 53 propagates to the reference microphone 53. The open structure faces downstream in the exhaust path, and can inhibit the airflow that passes through the exhaust path from traveling toward the reference microphone 53.

(2.4.4) The partition wall 37 extends over the entire height of the exhaust path, and the receiving space for the reference microphone 53 is covered so as to isolate the receiving space from the surroundings in the entire upstream of the open structure. Accordingly, the airflow is effectively inhibited from traveling toward the receiving space for the reference microphone 53. While the influence of the wind noise is reduced, the operating noise that is about to propagate outside the housing 30 through the exhaust path can be properly collected by the reference microphone 53. The influence of the wind noise collected by the reference microphone 53 on ANC can be effectively inhibited.

(2.4.5) The side walls 35A, 36A of the exhaust path are used to define the receiving space for the reference microphone 53 between the partition wall 37 and the side walls 35A, 36A. Accordingly, the structure that can effectively reduce the wind noise of the reference microphone 53 can be formed in the housing 30 at low cost.

(2.4.6) The reference microphone 53 is received in the receiving space in a state wrapped in the porous material 530 which functions as a windshield. The porous material 530 surrounds the reference microphone 53. Accordingly, the wind noise component is all the more effectively reduced.

(2.4.7) The porous material 37C for rectification is provided on the surface of the partition wall 37 opposite to the surface facing the receiving space for the reference microphone 53. The porous material 37C is effective in suppressing interference between a turbulent flow generated upstream of the partition wall 37 and the partition wall 37. As compared to a case where there is no porous material 37C, noise deriving from the airflow is effectively reduced in a case where there is the porous material 37C.

3. Variation

[3.1. First Variation]

Figure 11A:
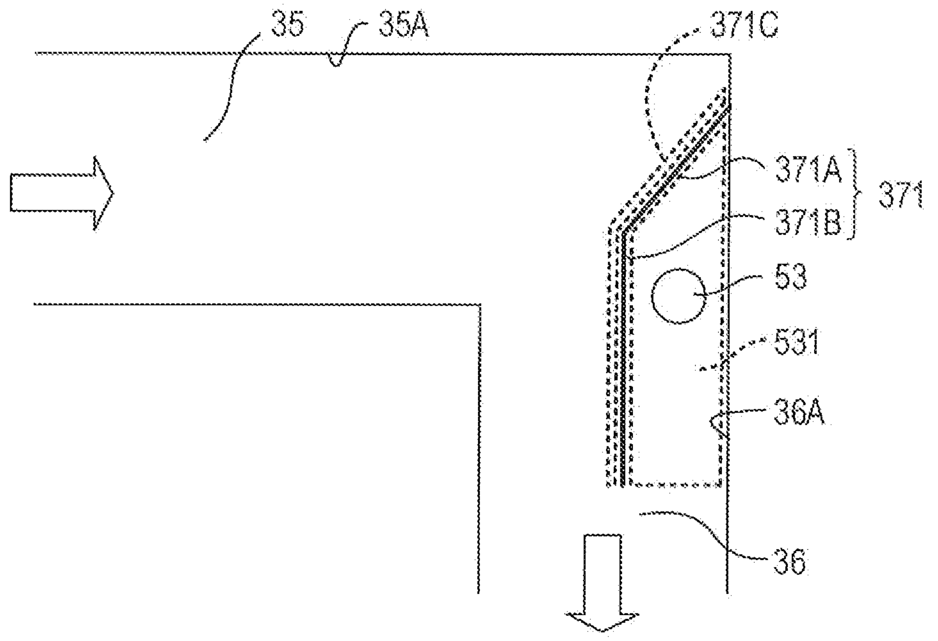
FIG. 11A is a diagram explaining a microphone receiving structure of a first variation.

In the aforementioned dust collector 1, the partition wall 37 may be replaced with a partition wall 371 having a structure shown in FIG. 11A. FIG. 11A shows a simple configuration around the exhaust path of the dust collector 1 in a first variation.

The partition wall 371 of the first variation includes a first wall element 371A and a second wall element 371B. The first wall element 371A is connected to the side wall 36A of the third flow path 36, and extends away from the side wall 36A. Specifically, the first wall element 371A extends diagonally downstream in the third flow path 36 at an angle to the side wall 36A from a connected portion between the first wall element 371A and the side wall 36A.

The second wall element 371B extends from the first wall element 371A toward the downstream in the third flow path 36. The second wall element 371B extends in parallel to the side wall 36A of the third flow path 36 at a specific distance away from the side wall 36A.

This partition wall 371 as well surrounds the receiving space for the reference microphone 53 between the partition wall 371 and the side wall 36A, and defines the receiving space. The partition wall 371 extends over the entire height of the third flow path 36 from ceiling to bottom, and covers the receiving space. The partition wall 371 forms an open structure between the partition wall 371 and the side wall 36A. As a result, the reference microphone 53 is arranged in the receiving space so that the operating noise can be properly collected through the open structure.

The reference microphone 53 is arranged in the receiving space in a state surrounded by a porous material 531 as a windshield. The partition wall 371 includes a porous material 371C for rectification on a surface opposite to a surface facing the receiving space for the reference microphone 53.

In FIG. 11A, the porous material 531 and the porous material 371C are represented by broken lines. The porous material 531 has a shape corresponding to the receiving space defined between the partition wall 371 and the side wall 36A, and almost fills the receiving space around the reference microphone 53. The porous material 371C is stuck to the entire surface of the partition wall 371 opposite to the surface facing the receiving space for the reference microphone 53.

According to the first variation, it is possible to inhibit the airflow from traveling toward the receiving space for the reference microphone 53 from upstream of the open structure, as in the aforementioned embodiment. The wind noise component in the sound signal of the reference microphone 53 can be effectively reduced.

[3.2. Second Variation]

Figure 11B:
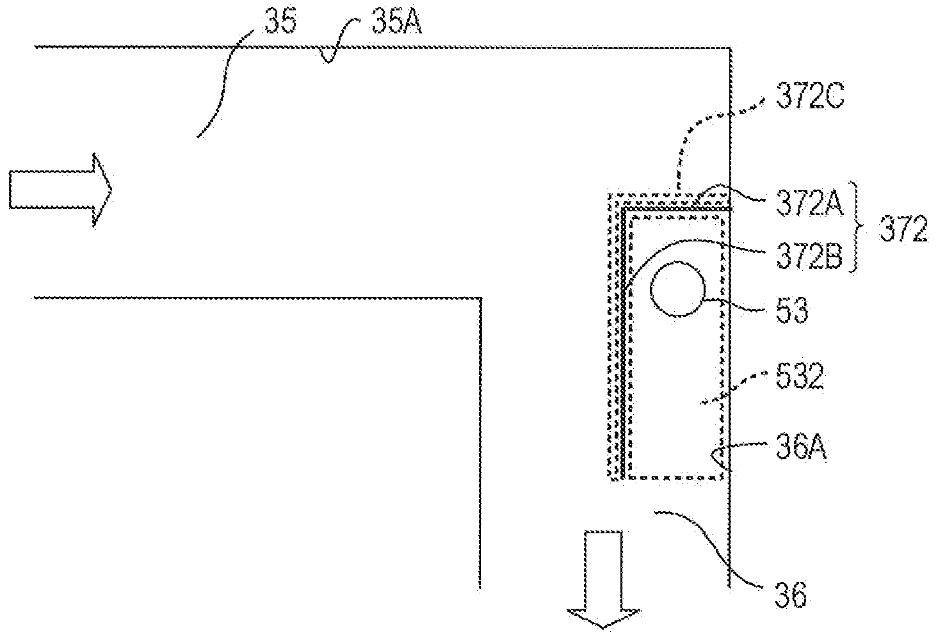
FIG. 11B is a diagram explaining the microphone receiving structure of a second variation.

In the aforementioned dust collector 1, the partition wall 37 may be replaced with a partition wall 372 having a structure shown in FIG. 11B. The partition wall 372 of a second variation includes a first wall element 372A and a second wall element 372B.

The first wall element 372A is connected to the side wall 36A of the third flow path 36, and extends rightward to be perpendicularly away from the side wall 36A. The second wall element 372B extends from the first wall element 372A toward the downstream in the third flow path 36. The second wall element 372B extends in parallel to the side wall 36A of the third flow path 36 at a specific distance away from the side wall 36A.

This partition wall 372 as well surrounds the receiving space for the reference microphone 53 between the partition wall 372 and the side wall 36A, and defines the receiving space. The partition wall 372 extends over the entire height of the third flow path 36 from ceiling to bottom, and covers the receiving space. The partition wall 372 forms an open structure between the partition wall 372 and the side wall 36A. As a result, the reference microphone 53 is arranged in the receiving space so that the operating noise can be properly collected through the open structure.

The reference microphone 53 is arranged in the receiving space in a state surrounded by the porous material 532 as a windshield. The porous material 532 has a shape corresponding to the receiving space defined between the partition wall 372 and the side wall 36A, and almost fills the receiving space around the reference microphone 53.

The partition wall 372 includes a porous material 372C for rectification on a surface opposite to a surface facing the receiving space for the reference microphone 53. The porous material 372C is stuck to the entire surface of the partition wall 372 opposite to the surface facing the receiving space for the reference microphone 53. In FIG. 11B, the porous material 532 and the porous material 372C are represented by broken lines.

According to the second variation, it is possible to inhibit the airflow from traveling toward the receiving space for the reference microphone 53 from upstream of the open structure, as in the aforementioned embodiment. The wind noise component in the sound signal of the reference microphone 53 can be effectively reduced.

[3.3. Third Variation]

Figure 12:
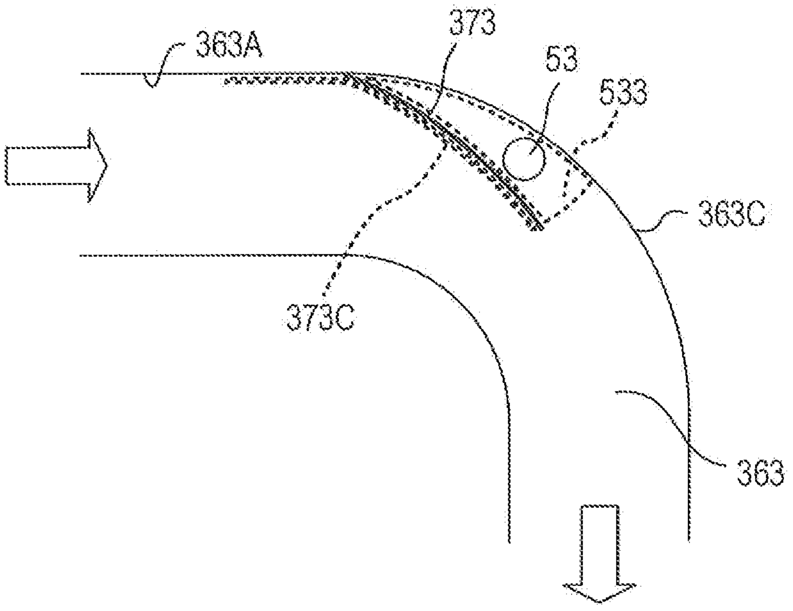
FIG. 12 is a diagram explaining the microphone receiving structure of a third variation.

The aforementioned dust collector 1 may be provided with an arc-curved exhaust path 363, as shown in FIG. 12, in place of the second flow path 35 and the third flow path 36 which form the L-shaped exhaust path.

The exhaust path 363 may be provided with a curved partition wall 373 having a structure shown in FIG. 12, in place of the partition wall 37. The partition wall 373 of the third variation is connected to a side wall 363A of the exhaust path 363 upstream of a curved portion 363C of the exhaust path 363, and extends to the downstream in the exhaust path 363 along the curved portion 363C of the exhaust path 363 from a connecting portion between the partition wall 373 and the side wall 363A.

The partition wall 373 is arranged to be away from the side wall 363A toward downstream in the exhaust path 363. As a result of this arrangement, the partition wall 373 defines the receiving space for the reference microphone 53 between the partition wall 373 and the side wall 363A of the exhaust path 363.

Specifically, the partition wall 373 surrounds the receiving space for the reference microphone 53 between the partition wall 373 and the side wall 363A, and defines the receiving space. The partition wall 373 extends over the entire height of the exhaust path 363 from ceiling to bottom and covers the receiving space. The partition wall 373 forms an open structure between the partition wall 373 and the side wall 363A. As a result, the reference microphone 53 can successfully collect the operating noise through the open structure.

The reference microphone 53 may be arranged in the receiving space in a state surrounded by the porous material 533 as a windshield. The porous material 533 has a shape corresponding to the receiving space and almost fills the receiving space around the reference microphone 53.

The partition wall 373 includes a porous material 373C for rectification on a surface opposite to a surface facing the receiving space for the reference microphone 53. The porous material 373C is stuck to the entire surface of the partition wall 373 opposite to the surface facing the receiving space for the reference microphone 53. In FIG. 12, the porous material 533 and the porous material 373C are represented by broken lines.

According to the third variation, it is possible to inhibit the airflow from traveling toward the receiving space for the reference microphone 53 from upstream of the open structure, as in the aforementioned embodiment. The wind noise component in the sound signal of the reference microphone 53 can be effectively reduced.

4. Others (4.1) According to the aforementioned embodiments and variations, the output from the microphone 53 is used in ANC. However, the output from the microphone 53 may be used for failure detection of the dust collector 1 based on the operating noise of the dust collector 1. In this case, the control speaker 54 and the error microphone 55 need not be provided in the dust collector 1.

(4.2) The technique of the present disclosure is not limited to application to the dust collector 1. The technique of the present disclosure may be applied to a work machine used in, for example, home carpentry, manufacturing, gardening, and/or construction work sites, in particular to a work machine that uses airflow from a fan. The technique of the present disclosure may be applied to a work machine for gardening, and/or a work machine that prepares a work site environment. For example, the technique of the present disclosure may be applied to various electric work machines such as electric lawn mower, electric grass trimmer, electric grass cutter, electric cleaner, electric blower, electric sprayer, electric spreader, electric dust collector, etc.

(4.3) A plurality of functions performed by a single element in the above-described embodiments may be achieved by a plurality of elements, or a function performed by a single element may be achieved by a plurality of elements. Also, a plurality of functions performed by a plurality of elements may be achieved by a single element, or a function performed by a plurality of elements may be achieved by a single element. Further, a part of a configuration in the above-described embodiments may be omitted. At least a part of a configuration in the above-described embodiments may be added to, or may replace, another configuration in the above-described embodiments.

What is claimed is:

1. A dust collector comprising:

a drive machine for dust collection including a motor and a fan connected to a rotation shaft of the motor;

a housing that houses the drive machine, the housing having an exhaust port;

an exhaust path for guiding an airflow generated from the fan by motion of the drive machine to the exhaust port located downstream, the exhaust path extending from the exhaust port toward the drive machine into the housing;

a microphone configured to collect sound in the housing, including operating noise generated in the housing by the motion of the machine, and output a sound signal that is an electrical signal corresponding to the sound;

a windshield that surrounds the microphone; and a structure provided along the exhaust path, the structure defining a receiving space for the microphone, the microphone being arranged in the receiving space in the housing in a state surrounded by the windshield, the structure including:

a partition wall extending from a sidewall of the exhaust path toward the downstream in the exhaust path, the partition wall extending over the entire height of the exhaust path from bottom to ceiling of the exhaust path; and an open structure that connects the receiving space to the exhaust path between a downstream end of the partition wall and the side wall, and the structure defining the receiving space between the side wall and the partition wall in the downstream of a connecting point between the side wall and the partition wall in the exhaust path and in upstream of the open structure.

2. A work machine comprising:

a machine;

a housing that at least partly houses the machine, the housing having an opening;

a path for controlling an airflow generated by motion of the machine, the path leading into the housing from the opening;

a microphone configured to collect sound in the housing, including operating noise generated in the housing by the motion of the machine, and output a sound signal that is an electrical signal corresponding to the sound; and a structure that defines a receiving space for the microphone along the path through which the operating noise propagates outside the housing, the microphone being arranged in the receiving space in the housing, the structure including an open structure that connects the receiving space with the path and faces downstream in the path, and the structure surrounding the receiving space upstream of the open structure in the path.

3. The work machine according to claim 2, wherein the structure includes a partition wall, the partition wall extends from a sidewall of the path toward the downstream in the path and away from the sidewall, and the structure uses the sidewall to surround the receiving space between the side wall and the partition wall in the downstream of a connecting point between the side wall and the partition wall in the path.

4. The work machine according to claim 2, wherein the structure includes a partition wall, the partition wall includes:

a first wall element connected to the side wall of the path, the first wall element extending away from the side wall; and a second wall element extending from the first wall element toward the downstream in the path, and the structure surrounds the receiving space between the side wall and the partition wall.

5. The work machine according to claim 2, wherein the structure covers the entire space of the receiving space located upstream of the open structure in the path.

6. The work machine according to claim 3, wherein the structure covers the entire space of the receiving space located upstream of the open structure in the path.

7. The work machine according to claim 4, wherein the structure covers the entire space of the receiving space located upstream of the open structure in the path.

8. The work machine according to claim 3, wherein the partition wall extends over the entire height of the path from bottom to ceiling of the path to cover the receiving space upstream of the open structure in the path.

9. The work machine according to claim 4, wherein the partition wall extends over the entire height of the path from bottom to ceiling of the path to cover the receiving space upstream of the open structure in the path.

10. The work machine according to claim 2, comprising a windshield that surrounds the microphone, wherein the microphone is arranged in the receiving space in a state surrounded by the windshield.

11. The work machine according to claim 3, comprising a windshield that surrounds the microphone, wherein the microphone is arranged in the receiving space in a state surrounded by the windshield.

12. The work machine according to claim 4, comprising a windshield that surrounds the microphone, wherein the microphone is arranged in the receiving space in a state surrounded by the windshield.

13. The work machine according to claim 3, comprising:

a windshield that surrounds the microphone; and a porous material for rectification that covers a side of the partition wall opposite to a side facing the receiving space, wherein the microphone is arranged in the receiving space in a state surrounded by the windshield.

14. The work machine according to claim 4, comprising:

a windshield that surrounds the microphone; and a porous material for rectification that covers a side of the partition wall opposite to a side facing the receiving space, wherein the microphone is arranged in the receiving space in a state surrounded by the windshield.

15. The work machine according to claim 8, comprising:

a windshield that surrounds the microphone; and a porous material for rectification that covers a side of the partition wall opposite to a side facing the receiving space, wherein the microphone is arranged in the receiving space in a state surrounded by the windshield.

16. The work machine according to claim 9, comprising:

a windshield that surrounds the microphone; and a porous material for rectification that covers a side of the partition wall opposite to a side facing the receiving space, wherein the microphone is arranged in the receiving space in a state surrounded by the windshield.

17. The work machine according to claim 2, comprising:

a processor configured to execute a process related to the operating noise based on the sound signal from the microphone.

18. The work machine according to claim 17, comprising:

a speaker, wherein the process related to the operating noise includes a process to cause the speaker to output a control sound for inhibiting the operating noise from propagating outside the housing.

19. The work machine according to claim 2, wherein the path is an exhaust path for guiding the airflow generated by the motion of the machine out of the housing, and the opening is an exhaust port, and the structure defines the receiving space for the microphone along the exhaust path.

* * * * *